(12) United States Patent
Erbe et al.

(10) Patent No.: US 9,823,437 B2
(45) Date of Patent: Nov. 21, 2017

(54) ADJUSTABLE LENS MOUNT

(71) Applicant: JENOPTIK Optical Systems GmbH, Jena (DE)

(72) Inventors: Torsten Erbe, Jena (DE); Stephan Fahr, Jena (DE)

(73) Assignee: Jenoptik Optical Systems GmbH, Jena (DE)

( * ) Notice: Subject to any disclaimer, the term of this patent is extended or adjusted under 35 U.S.C. 154(b) by 0 days.

(21) Appl. No.: 15/280,084

(22) Filed: Sep. 29, 2016

(65) Prior Publication Data
US 2017/0090143 A1 Mar. 30, 2017

(30) Foreign Application Priority Data

Sep. 30, 2015 (DE) ........................ 10 2015 116 584

(51) Int. Cl.
G02B 7/02 (2006.01)
G03B 21/14 (2006.01)
G02B 7/00 (2006.01)
G03B 5/02 (2006.01)

(52) U.S. Cl.
CPC ............. *G02B 7/023* (2013.01); *G02B 7/004* (2013.01); *G02B 7/026* (2013.01); *G03B 5/02* (2013.01); *G03B 21/142* (2013.01)

(58) Field of Classification Search
CPC ........ G02B 7/003; G02B 7/004; G02B 7/021; G02B 7/023; G02B 7/026; G03B 3/00; G03B 5/00; G03B 5/02; G03B 21/06; G03B 21/14; G03B 21/142
USPC ........ 359/811, 813, 819, 830; 353/100, 101; 396/73
See application file for complete search history.

(56) References Cited

U.S. PATENT DOCUMENTS

| 6,191,898 | B1 | 2/2001 | Trunz et al. |
| 7,239,462 | B2 | 7/2007 | Rau et al. |
| 7,903,353 | B2 | 3/2011 | Reichmann et al. |
| 9,036,077 | B2 * | 5/2015 | Terahara ............... G02B 7/021 348/360 |

FOREIGN PATENT DOCUMENTS

| DE | 199 01 295 A1 | 7/2000 |
| DE | 10 2007 030 579 A1 | 1/2008 |
| DE | 10 2008 029 161 B3 | 10/2009 |
| EP | 1 577 693 A2 | 9/2005 |

* cited by examiner

Primary Examiner — Loha Ben
(74) Attorney, Agent, or Firm — Duane Morris LLP

(57) ABSTRACT

An adjustable lens mount with an outer mount ring, a laterally adjustable inner mount ring and at least two connection structures. The at least two connection structures communicate in each instance with a manipulator with a radial acting axis. The connection structures in each instance have a coupling member and a lever connected therewith. The coupling member is connected to the inner mount ring farther radially outside than the lever is connected to the outer mount ring.

8 Claims, 3 Drawing Sheets

ADJUSTABLE LENS MOUNT

RELATED APPLICATIONS

The present application claims priority benefit of German Application No. DE 10 2015 116 584.8 filed on Sep. 30, 2015, the contents of which is incorporated by reference in its entirety.

FIELD OF THE INVENTION

The invention is directed to an adjustable monolithic lens mount which is divided by material cuts in an annular body into a stationary outer mount ring, a laterally adjustable inner mount ring and at least two connection structures connecting the inner mount ring and outer mount ring, and the connection structures can be manipulated in each instance by a manipulator. A generic mount is known from DE 10 2008 029 161 B3.

BACKGROUND OF THE INVENTION

An optical imaging device in which an outer mount and an inner ring which is adjustable relative to it are preferably fabricated monolithically from one piece is known from DE 199 01 295 A1. A manipulating device which serves to displace the optical element held in the inner ring in a path-controlled manner in direction perpendicular to the optical axis comprises between the inner ring and outer ring a system of circumferential slots with intermediate connection members, a rotary joint and at least one adjusting joint with an adjusting member.

The disadvantage of this solution consists particularly in that, as a result of the multitude of differently formed manipulator units, referred to therein as manipulator elements, it has a complicated and asymmetrical construction which is unsuitable for symmetrical systems or which leads to system instabilities.

A lens mount which is fashioned from one piece and, therefore, monolithically is also known from EP 1 577 693 A2. In a preferred construction, an inner ring is connected to an outer ring via three manipulator units, referred to therein as adjusting joints, with two articulated arms in each instance and an adjusting part located therebetween. Actuators act at the adjusting joints for lateral adjustment of the inner ring and, therefore, of the optical element. The two articulated arms and the adjusting part located therebetween can also be conceived of as two toggle levers which are connected in parallel and formed in each instance from two levers (members) connected via a joint, one of the free lever ends is connected in each instance to the lens mount via a joint and the other respective free ends are rigidly connected to one another via the adjusting part. The two joints connecting the lens mount to the manipulator units are arranged radially one behind the other. As a result of the two toggle levers arranged one behind the other in radial direction in a plane, the manipulator units take up a relatively large space.

The solution shown here is characterized by a higher temperature stability compared to the above-cited DE 199 01 295 A1.

A lens mount according to the above-cited EP 1 577 693 A2 claims the advantage that a greater lateral stiffness of the inner ring connection can be achieved by making the articulated arms shorter so that the lens mount with the lens held therein is stiffer against natural vibrations. However, increasing lateral stiffness by shortening the articulated arms is accomplished at the expense of adjustment sensitivity which includes not only the length of the members but also the bending of the articulated arms.

In this case, however, the length of the articulated arms is further predetermined by the permissible material loading; that is, if the permissible material loading is reached with predetermined actuating displacement and predetermined sensitivity, a further shortening of the joints to increase stiffness or natural frequency is not possible. Consequently, two articulated arms which are relatively thin and also long in proportion to cross section are always required in order to carry out the function as adjusting unit or joint, which basically limits the achievable lateral and axial stiffness.

DE 10 2007 030 579 A1 describes a first construction for a laterally adjustable lens mount such as that corresponding substantially to the above-cited EP 1 577 693 A2, i.e., three manipulator units which are arranged at an offset of 120° relative to one another are formed in each instance as a member which transitions at its fixed end into two tangentially oriented articulated arms, referred to therein as webs, which are connected to the inner mount part and outer mount part, respectively.

In a second embodiment form, the webs connecting the member to the inner mount part and outer mount part are radially oriented so that a greater lateral stiffness is achieved.

However, with radial webs compared to the tangential webs, a deflection of the lever due to a radially acting force introduced at the free lever end via a manipulator leads to much higher tensile forces in the webs. In this case, the occurrence of unwanted stresses in the inner ring is unavoidable.

In both constructions, the manipulator units are simple lever linkages having a gear ratio which is determined via the length of the member and the bending of the webs in radial direction. To obtain a high sensitivity with corresponding actuating paths, the webs and articulated arms are constructed to be long, which can lead to twisting in axial direction.

A lens mount which is divided through material cuts in an annular ring into a stationary outer mount ring, a laterally adjustable inner mount ring and at least two connection structures which can be manipulated in each instance via a manipulator is known from DE 10 2008 029 161 B3, cited above. The connection structures are formed by two members which act as coupler and which are connected to one another and, in each instance, by an end to the inner mount ring and to the outer mount ring, respectively, via flexure bearings. The two members together form an angle greater than 90° and less than 180° so that the flexure bearing connecting the two members, considered tangentially, is arranged between the two members. In a preferred embodiment form, a lever is fixedly arranged at the member connected to the outer mount ring, the free end of this lever facing the flexure bearing formed at the inner mount ring.

To perform an adjustment of the inner mount ring relative to the outer mount ring, a radial force is directed to the free end of the lever via a manipulator which is temporarily inserted into the outer mount ring or is permanently arranged in the outer mount ring. A deflection of the lever brought about in this way is transformed into a lateral displacement of the flexure bearing connecting the connection structure to the inner mount ring. For this purpose, the lever should be as long as possible to achieve high sensitivity. At the same time it is desirable that the inner mount ring be constructed so as to be as stiff as possible against radially introduced forces, which can be achieved principally when the flexure bearing connecting the connection structure to the inner mount ring has the greatest possible radial distance from the axis of symmetry of the annular body.

A final adjustment by turning is usually carried out for lens mounts of this kind after the material slots have been introduced, e.g., through spark erosion or water jet cutting, and after a lens has been fitted to the inner mount ring. Since, in doing so, surfaces must be machined at the outer mount ring, free surfaces must be provided in the outer mount ring for receptacles which are needed for this purpose and via which the lens mounts can be received by a tool holder. Free surfaces of this kind may also be required for installing component parts remaining on the lens mount such as a shutter. The space requirement needed for this is taken into account in the dimensioning of the thickness of the outer mount ring (radial extension of the outer mount ring). The arrangement of free surfaces of this kind is not taken into consideration in the above-mentioned DE 10 2008 029 161 B3 or in other publications of the disclosed prior art.

It may be considered an ongoing challenge to construct a lens mount which is as small as possible with respect to its radial extension, but at the same time to construct an inner mount ring which is as large as possible with respect to its radial extension in order to achieve a high radial stiffness of the inner mount ring.

It is the object of the invention to improve a lens mount according to the above-cited DE 10 2008 029 161 B3 such that it has a greater lateral stiffness and a lower natural frequency.

This object is met for an adjustable lens mount which is divided through material cuts in an annular body with an axis of symmetry into an outer mount ring, a laterally adjustable inner mount ring and at least two connection structures. The at least two connection structures communicate in each instance with a manipulator with a radial acting axis. They have in each instance a coupling member which is connected to the inner mount ring via a first flexure bearing at a first coupling end and a lever with a free first lever end against which one of the manipulators abuts. The lever communicates by a second lever end with a second coupling end of the coupling member via a second flexure bearing and is connected between a free first lever end and a second lever end to the outer mount ring via a third flexure bearing. The first flexure bearing is arranged farther outside radially than the third flexure bearing. The coupling member, abstracted to a first straight connecting line, and the lever, abstracted to a second connecting line, are arranged opposite one another with reference to an imaginary radial straight line passing through the second flexure bearing, the coupling member forms a first angle of less than 90° with the imaginary radial straight line, and the lever forms a second angle of less than 90° with the imaginary radial straight line.

In an advantageous manner, the first angle formed by the coupling member with the imaginary radial straight line is less than 45°, particularly less than 30°, so that the first flexure bearing lies far outside radially and the coupling member is kept short.

It turns out to be favorable when the second angle formed by the lever with the imaginary radial straight line is greater than 45° so that a length of the lever of one of the connection structure scan be elongated until approximating an adjacent one of the connection structures so that the sensitivity of the adjustment can be widely varied via the choice of the length of the lever.

As a result of the above-mentioned features of the connection structures, projections result radially outside of the second flexure bearing which are advantageously constructed in such a way that they are sufficient with respect to size and geometry to be utilized as free surfaces, e.g., for a receptacle in a tool holder.

BRIEF DESCRIPTION OF THE DRAWINGS

The invention is described more fully in the following by way of example referring to the drawings. The drawings show:

FIG. 1b is a detailed view of a connection structure according to the first embodiment example from FIG. 1a;

FIG. 2b is a detailed view of a connection structure according to the second embodiment example from FIG. 2a.

DETAILED DESCRIPTION OF THE DRAWINGS

Figure 1A:
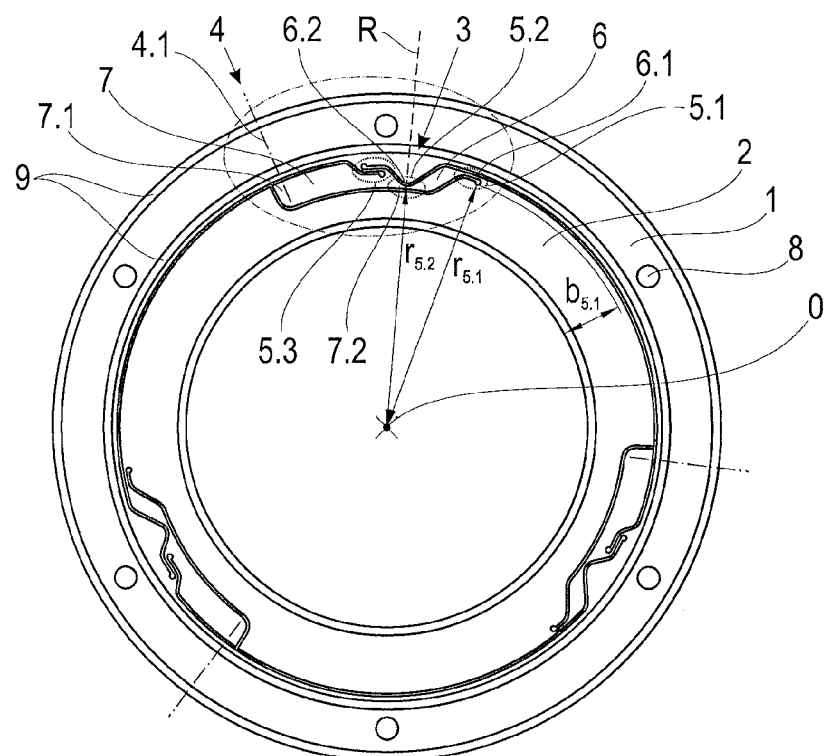
FIG. 1a is a top view of a lens mount according to a first embodiment example.
Figure 2A:
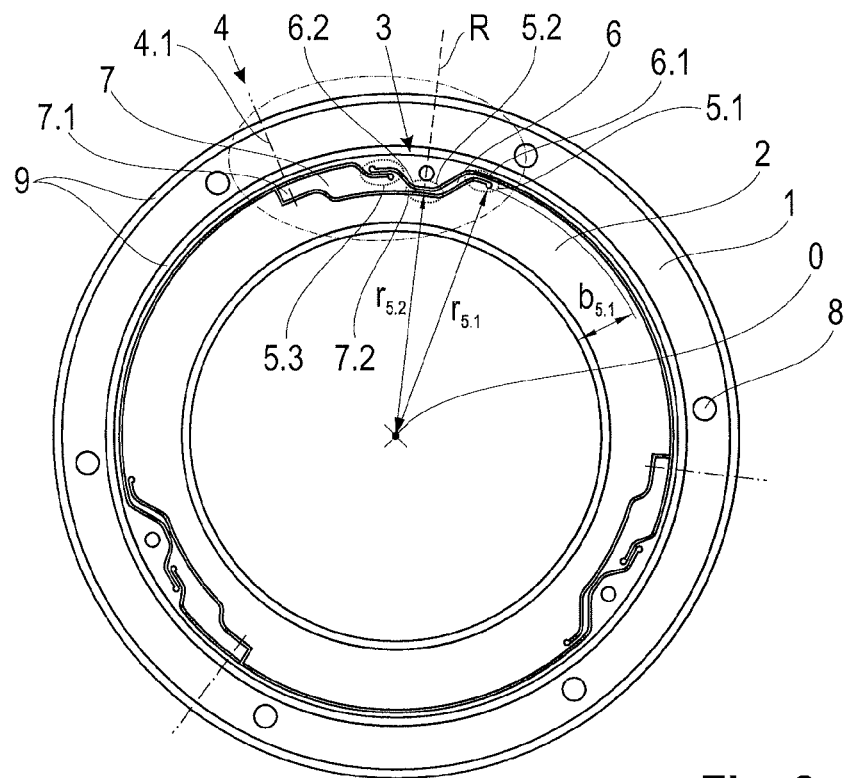
FIG. 2a is a top view of a lens mount according to a second embodiment example.

As is shown in FIGS. 1a and 2a, an adjustable lens mount according to the invention basically comprises an outer mount ring 1, an inner mount ring 2 and at least two connection structures 3 which are produced through cuts forming material slots in an annular body with an axis of symmetry 0 so that the connection structures 3 connect the outer mount ring 1 and inner mount ring 2 monolithically. The at least two connection structures 3 communicate in each instance with a manipulator 4 having a radial acting axis 4.1. Manipulators 4 to be considered include mechanical elements such as set screws or electric elements such as piezo elements via which the small actuating paths and actuating forces can be conducted into a lever 7. In addition to the at least two connection structures 3, the lens mount can have further connection structures 3 of different configurations. The connection structures 3 comprise in each instance a coupling member 6, which is connected at a first coupling end 6.1 to the inner mount ring 2 via a first flexure bearing 5.1, and a lever 7 against whose free first lever end 7.1 one of the manipulators 4 abuts, the second lever end 7.2 of the lever 7 being connected via a second flexure bearing 5.2 to a second coupling end 6.2 of the coupling member 6. Lever 7 is connected between its free first lever end 7.1 and its second lever end 7.2 to the outer mount ring 1 via a third flexure bearing 5.3. It is key to the invention that the first flexure bearing 5.1 is arranged farther outward radially than the third flexure bearing 5.3; that is, the radial distance $r_{5.1}$ of the first flexure bearing 5.1 from the axis of symmetry 0 is greater than the radial distance $r_{5.2}$ of the second flexure bearing 5.2 from the axis of symmetry 0.

Accordingly, the width $b_{5.1}$ of the inner mount ring 2 is increased through the first flexure bearing 5.1 via which forces may possibly be conducted into the inner mount ring 2 and is maximized taking into account a minimum width for the outer mount ring 1.

A lens mount according to the invention is distinguished from generic lens mounts known from the art by the special configuration of the connection structures 3.

Figure 1B:
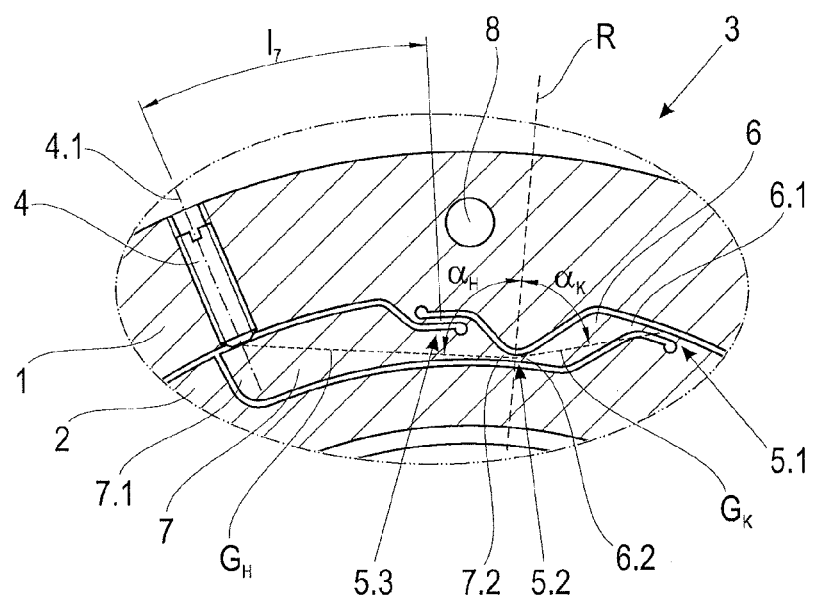

A first embodiment example is shown in FIGS. 1a and 1b. In this case, it is assumed that only one annular end face 9 adjoining the outer circumference need be turned for adjustment at the outer mount ring 1. For this reason, any receptacles for adjustment turning which may be needed for this purpose within the free surface 8, e.g., in the form of a plane surface with a threaded bore hole, are accommodated in the outer mount ring 1 for whose mechanical stability a minimum radial extension is required, even when bore holes are provided for installing the lens mount with other lens mounts, as will be shown later in the second embodiment example. The coupling member 6 and the lever 7 are constructed so as to be sufficiently thick that they can be assumed to be stiff. The flexure bearings 5.1, 5.2 and 5.3 are very thin and flexible in comparison.

Figure 3:
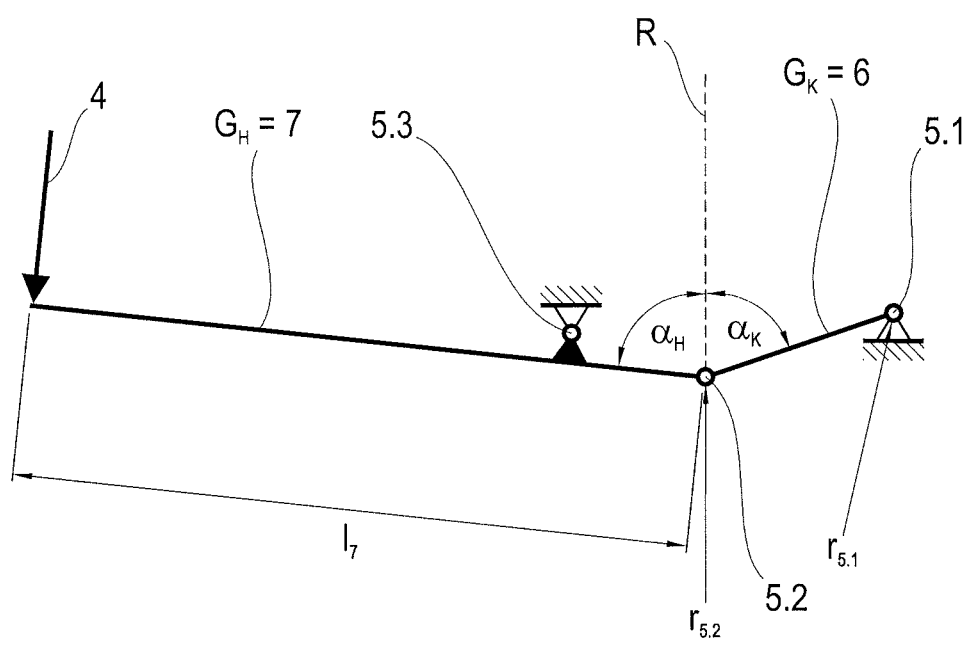
FIG. 3 is a linkage diagram for the connection structures according to FIGS. 1b and 2b.

The connection structure 3 according to the first embodiment example but also according to the second embodiment example described later can be explained by means of a linkage diagram shown in FIG. 3.

It is key to the invention that the coupling member 6, abstracted to a first straight connecting line $G_K$ between the first flexure bearing 5.1 and second flexure bearing 5.2, and the lever 7, abstracted to a second straight connecting line $G_H$ between the second flexure bearing 5.2 and the free first lever end 7.1, are arranged opposite one another with reference to an imaginary radial straight line R through the second flexure bearing 5.2 and form with the imaginary radial straight line R a first angle $\alpha_K$ and a second angle $\alpha_H$, respectively. Accordingly, the connection structure 3 can be dimensioned in such a way that the first flexure bearing 5.1 is situated far outside radially independent from the length $l_7$ of the lever 7, for which purpose the first angle $\alpha_K$ formed by the coupling member 6 with the imaginary radial straight line R is less than 90°, preferably less than 45°, so that the coupling member 6 is also kept short. By means of this arrangement of the coupling member 6 and lever 7, the coupling member 6 which should be as short as possible and the lever 7 which should be as long as possible can be dimensioned independently from one another compared to the prior art. The width $b_{5.1}$ of the inner mount ring 2 through the first flexure bearing 5.1 is decisive for the radial stiffness of the inner mount ring 2 relative to forces which act in a radial plane and which can be conducted into the inner mount ring 2 via the first flexure bearing 5.1. Due to the fact that this width $b_{5.1}$ is made greater than the other width of the inner mount ring 2, the stiffness of the inner mount ring 2 is efficiently increased precisely where this is needed.

Although the first flexure bearing 5.1 is arranged comparatively far outside radially, the coupling member 6 can be kept short, which results in a required high natural frequency of the inner mount ring 2, which is a substantial advantage of the lens mount.

The length $l_7$ of the lever 7 can be extended until approximating the adjacent connection structure 3 so that the second angle $\alpha_H$ formed by the lever 7 with the imaginary radial straight lines R is selected as large as possible, greater than 45°, preferably greater than 60°, but always less than 90°. In this way, the sensitivity of the adjustment can be varied widely through the choice of the length $l_7$ of the lever 7.

Figure 2B:
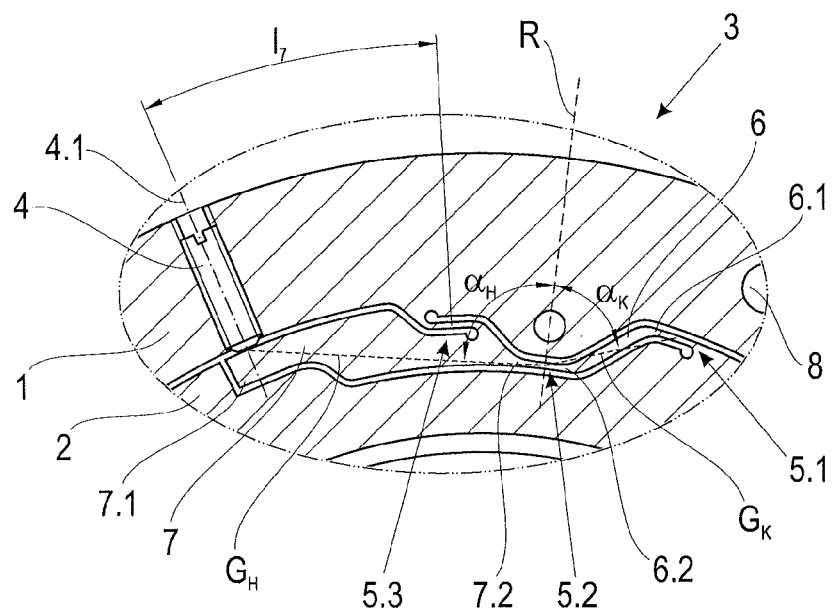

A second embodiment example is shown in FIGS. 2a and 2b. In this case, it is assumed that two annular end faces 9 are provided at the outer mount ring 1 for contacting other lens mounts between which, e.g., bore holes for assembly can be located. In order for the two end faces 9 to be adjusted by turning simultaneously or one after the other without reclamping, the receptacles required for this must lie on free surfaces 8 radially inside the inner end face 9, for which reason the outer mount ring 1 must be made wider corresponding to the space requirement of the free surfaces 8.

The idea underlying the second embodiment example is not to provide the space for the free surfaces 8 by correspondingly wider dimensioning of the outer mount ring 1 as a whole, but rather to integrate these free surfaces 8 in each instance into one of the connection structures 3. Accordingly, the outer mount ring 1 need not be enlarged in its radial extension because of the free surfaces 8. Instead, the projections of the outer mount ring 1 which are provided in any case by the connection structures 3 radially outside of the second flexure bearing 5.2 are utilized for the free surfaces 8.

In order to configure this projection so as to be sufficiently large, the second flexure bearing 5.2 is formed by an extended narrowed portion, i.e., a web which is narrow and accordingly flexible compared to the coupling member 6. The flexure bearings 5.1, 5.3 adjoining the inner mount ring 2 and outer mount ring 1, respectively, are constructed in this case as thin, flexible webs. The construction of the flexure bearings 5.1, 5.2, 5.3 are not restricted to one or the other embodiment example.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE CHARACTERS

0 axis of symmetry
1 outer mount ring
2 inner mount ring
3 connection structure
4 manipulator
4.1 radial acting axis
5.1 first flexure bearing
5.2 second flexure bearing
5.3 third flexure bearing
6 coupling member
6.1 first coupling end
6.2 second coupling end
7 lever
7.1 free first lever end
7.2 second lever end
8 free surface
9 end face
$G_K$ first straight connecting line $G_K$ (between the first flexure bearing 5.1 and the second flexure bearing 5.2; abstracted coupling member 6)
$G_H$ second straight connecting line $G_H$ (between the second flexure bearing 5.2 and the free first lever end 7.1; abstracted lever 7)
$\alpha_K$ first angle (of the coupling member 6 with the imaginary radial straight line R)
$\alpha_H$ second angle (of the lever 7 with the imaginary radial straight line R)
R imaginary radial straight line (through the second flexure bearing 5.2)
$l_7$ length of the lever 7
$r_{5.1}$ radial distance (of the first flexure bearing 5.1 from the axis of symmetry 0)
$r_{5.2}$ radial distance (of the second flexure bearing 5.2 from the axis of symmetry 0)
$b_{5.1}$ width of the inner mount ring 2 (at the first flexure bearing 5.1)

What is claimed is:

1. An adjustable lens mount comprising, an annular body with an axis of symmetry, said annular body being divided through material cuts into an outer mount ring, a laterally adjustable inner mount ring and at least two connection structures, wherein the at least two connection structures communicate in each instance with a manipulator with a radial acting axis, the connection structures each have a coupling member which is connected to the inner mount ring via a first flexure bearing at a first coupling end and a lever with a free first lever end contacted by one of the manipulators, said lever communicates by a second lever end with a second coupling end of the coupling member via a second flexure bearing, the lever is further connected between its free first lever end and its second lever end to the outer mount ring via a third flexure bearing, and the first flexure bearing is arranged farther outside radially than the third flexure bearing, wherein the coupling member, abstracted to a first straight connecting line between the first flexure bearing and the second flexure bearing, and the lever, abstracted to a second connecting line between the second flexure bearing and the free first lever end, are arranged opposite one another with reference to an imaginary radial straight line passing through the second flexure bearing, and the coupling member forms a first angle of less than 90° with the imaginary radial straight line, and the lever forms a second angle of less than 90° with the imaginary radial straight line.

2. The adjustable lens mount according to claim 1, wherein the first angle formed by the coupling member with the imaginary radial straight line is less than 45° so that the first flexure bearing lies far outside radially and the coupling member is kept short.

3. The adjustable lens mount according to claim 2, wherein the first angle formed by the coupling member with the imaginary radial straight line is less than 30°.

4. The adjustable lens mount according to claim 2, wherein the second angle formed by the lever with the imaginary radial straight line is greater than 45° so that a length of the lever of one of the connection structures is elongated until an adjacent one of the connection structures so that the sensitivity of the adjustment can be varied via the choice of the length of the lever.

5. The adjustable lens mount according to claim 4, wherein the second angle formed by the lever with the imaginary radial straight line is greater than 60°.

6. The adjustable lens mount according to claim 1, wherein the second angle formed by the lever with the imaginary radial straight line is greater than 45° so that a length of the lever of one of the connection structures is elongated until an adjacent one of the connection structures so that the sensitivity of the adjustment can be varied via the choice of the length of the lever.

7. The adjustable lens mount according to claim 6, wherein the second angle formed by the lever with the imaginary radial straight line is greater than 60°.

8. The adjustable lens mount according to claim 1, further comprising a projection at which a free surface is provided in each instance, said projection being formed in each instance radially outside of the second flexure bearing at the outer mount ring.

* * * * *